May 12, 1959      J. P. GLEASON      2,886,810

RANGE TRACKING SYSTEM

Filed July 24, 1952      3 Sheets-Sheet 1

Inventor:
Joseph P. Gleason,
by Merton D Morse
His Attorney.

May 12, 1959

J. P. GLEASON

2,886,810

RANGE TRACKING SYSTEM

Filed July 24, 1952

Inventor:
Joseph P. Gleason,
by Merton D Morse
His Attorney.

May 12, 1959

J. P. GLEASON 2,886,810

RANGE TRACKING SYSTEM

Filed July 24, 1952

Inventor:
Joseph P. Gleason,
by Merton D. Morse
His Attorney.

United States Patent Office 2,886,810
Patented May 12, 1959

2,886,810

RANGE TRACKING SYSTEM

Joseph P. Gleason, Hermosa Beach, Calif., assignor to General Electric Company, a corporation of New York Application July 24, 1952, Serial No. 300,723

11 Claims. (Cl. 343—7.3)

My invention relates to object locating apparatus and, more particularly, pertains to an improved range tracking system for pulse-echo apparatus such as radar equipment.

Radar equipment incorporating a range tracking system may be utilized to track automatically the range of a remote object from which echo pulses are reflected and my invention has for one of its objects certain improvements in the range tracking system whereby a tracking rate is established and is maintained substantially constant during fading periods in which returning echoes are materially reduced in amplitude or entirely lost.

Another object of my invention is to provide an improved range tracking system which attains, in a minimum amount of time after echo pulses from a remote object are encountered, an operating condition for maintaining an established tracking rate substantially constant during fading periods.

An additional object of my invention is to provide an improved range tracking system which for a short time after echo pulses are first received has the ability to respond to extremely high accelerations and thereby facilitate lock-on with a rapidly moving reflecting object, and, after lock-on is achieved, has a relatively reduced ability to track accelerations of the object and thereby assure tracking of the remote object despite extraneous pulses which might otherwise undesirably interfere with tracking.

Another object of my invention is to provide an improved range tracking system which may be utilized for searching a predetermined range and which includes a provision for facilitating a lock-on condition with a remote object which might otherwise be missed.

Briefly stated, a range tracking system in accordance with my invention comprises a first means responsive to reflected pulses of energy from a remote object which occur during a predetermined interval of time for establishing an accumulation of energy having a value representing a characteristic of the reflected pulses, such as their timing relationship with respect to a reference signal. The voltage resulting from this integration represents relative velocity of the remote object and is supplied to an isolation stage which, in turn, applies a current proportional to this voltage to a second integrating means. The current which flows in the latter integrating means produces a voltage change which is utilized for controlling the time-occurrence of the aforementioned interval of time to provide thereby automatic range tracking. A regenerative circuit coupled to the second integrating means is provided to maintain the current flow therein at the value attained preceding a reduction in amplitude or a loss of received echo pulses. Since the last-mentioned current is representative of object velocity, the system thus has "velocity memory."

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which:

Figure 1:
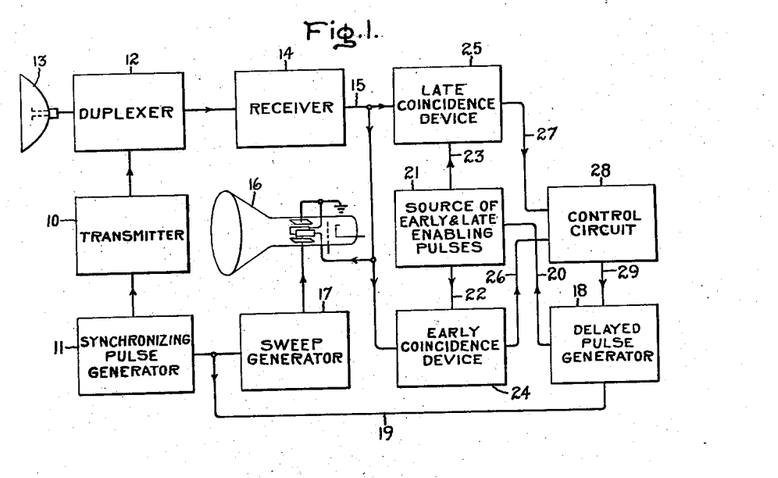
Fig. 1 is a block diagram of a complete radar apparatus incorporating an automatic range tracking system embodying my present invention.

Referring now to Fig. 1 of the drawings, the radar apparatus there shown includes a transmitter 10 which, under the control of pulses from a synchronizing pulse generator 11, supplies pulses or "bursts" of radio-frequency energy through a duplexer unit 12 to a directional antenna 13 for radiation into space. Such energy travels through space and may impinge upon a reflecting surface, and, after reflection, returning pulses are intercepted by the antenna 13.

Received pulses are supplied through duplexer 12 to a receiver 14 wherein demodulation occurs and a pulse-type output wave appears at a lead 15. Duplexer unit 12 may be of any well-known construction for preventing blocking and/or damage to receiver 10. Moreover, it serves to translate wave energy from antenna 13 with substantially no attenuation, which might otherwise occur due to the connection between transmitter 10 and the antenna.

The pulse wave at lead 15 is applied to the vertical deflection plates of a cathode ray type indicator 16, to the horizontal deflection plates of which a highly linear sawtooth sweep wave is applied from generator 17 under the control of pulses from source 11. Thus, the beam trace on the viewing screen of cathode ray tube 16 is initiated at one side of the screen at the instant a pulse is transmitted by antenna 13 and proceeds across the screen at a linear rate. The time interval of the entire sweep corresponds to the range of the radar equipment and returning echoes deflect the trace vertically. The distance from the beginning of the trace to such an indication is proportional to the distance to the corresponding reflecting object and, hence, the apparatus may be employed for range determination.

The elements 10–17, thus far described, may be of any well known construction or, for example, may be like the corresponding elements described in Patent 2,467,208 of William C. Hahn.

The apparatus shown in Fig. 1 also includes provisions for automatically tracking the range of a remote object. This comprises a delayed pulse generator 18 to which synchronizing pulses from generator 11 are applied over a lead 19. Generator 18 produces pulses which are of controllable occurrence relative to pulses from generator 11. An example of such pulses is represented by curve A of Fig. 2. This figure illustrates various wave forms in the range tracking system plotted to the same time scale. The double-ended arrow associated with curve A indicates that the pulses produced by generator 18 may be varied in their time occurrence.

Generator 18 is coupled by a lead 20 to a source 21 of early and late enabling pulses. The pulses produced by source 21 occur in pairs and may be such as those represented by curves B and C, respectively, of Fig. 2. It will be observed from this figure, that the leading edge of the early or "B" pulse occurs at the inception of the "A" pulse and that the leading edge of the "late" or "C" pulse is concurrent with the trailing edge of the "B" pulse. The "B" and "C" pulses are of approximately equal, fixed duration and define an interval of time which is synchronized to the leading edge of the "A" pulse. The several pulses are shown as plotted along a common time scale on the lower line of Fig. 2.

The "B" and "C" enabling pulses are supplied via leads 22 and 23 to early and late coincidence devices 24 and 25, respectively. The coincidence devices are normally inoperative, but are operatively conditioned in response to the applied enabling pulses and may comprise, for example, individual, normally disabled electron discharge devices. The detected echoes from receiver 14 are supplied over extensions of lead 15 to both of the coincidence devices 24 and 25 and the amount of current flow in each device is dependent upon the timing of received echo pulses relative to the "B" and "C" enabling pulses. This may be more apparent from the representation at the lower line of Fig. 2 wherein an echo pulse $p$ is shown as being equally bracketed in time by the enabling pulses. With such a timing relationship, the devices 24 and 25 conduct equal amounts of current. However, should echo pulse $p$ be displaced in time in one sense or the other from that illustrated, the amount of conduction in the coincidence devices is unbalanced in a corresponding sense.

The coincidence devices 24 and 25 are coupled by leads 26 and 27 to a control circuit 28 constructed in accordance with my present invention and to be described in detail hereinafter. As will be later shown, circuit 28 includes means for producing a control potential having a magnitude dependent upon the relative current conduction in devices 24 and 25 and this control potential is supplied via a lead 29 to pulse generator 18 for controlling the occurrence of the pulses generated thereby.

Figure 2:
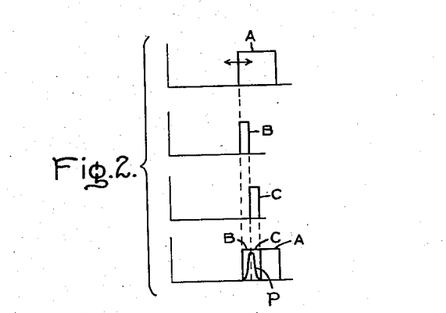
Fig. 2 represents various wave forms useful in explaining the operation of the apparatus shown in Fig. 1.

Specifically, the second derivative of the control potential on conductor 29 is proportional to the relative current conduction in devices 24 and 25, and is representative of the timing relationship of received echo pulses with the interval of the "B" and "C" enabling pulses. If echo pulse $p$ of Fig. 2 is not equally bracketed in time by the enabling pulses, the occurrence of the "A" pulse is varied thereby to displace in time the interval of the enabling pulses in a direction to achieve such a condition. In this way, a reflecting object may be automatically tracked by the radar apparatus of Fig. 1.

Elements 18, 21, 24 and 25 of the automatic tracking system just described may be of any well-known construction or for example, may be similar to corresponding elements disclosed in the aforementioned Hahn patent.

As will be later shown, circuit 28 also includes provisions for range-searching whereby the time-occurrences of the intervals of enabling pulses are varied from a short range to a maximum range at a slow rate and then quickly returned to the short range in a repetitive manner. When echo pulses from a remote object are encountered, that is, the interval of enabling pulses intercepts the interval of echo pulses from the object, alarm means included in circuit 28 automatically converts the circuit from its range-searching function to the range-tracking operation.

As thus far described, the apparatus is generally satisfactory for automatically tracking the range of an object which produces reflections of consistently high amplitude. However, at extreme ranges returning echoes from the remote object may be temporarily lost. This may be due to a change in attitude of the object, multiple reflections causing wave cancellations, or a variety of circumstances. If such an object is rapidly moving, reflected pulses from it, following an interruption in reception, may occur outside the interval of enabling pulses and automatic tracking ceases, unless a special provision is made.

Figure 3:
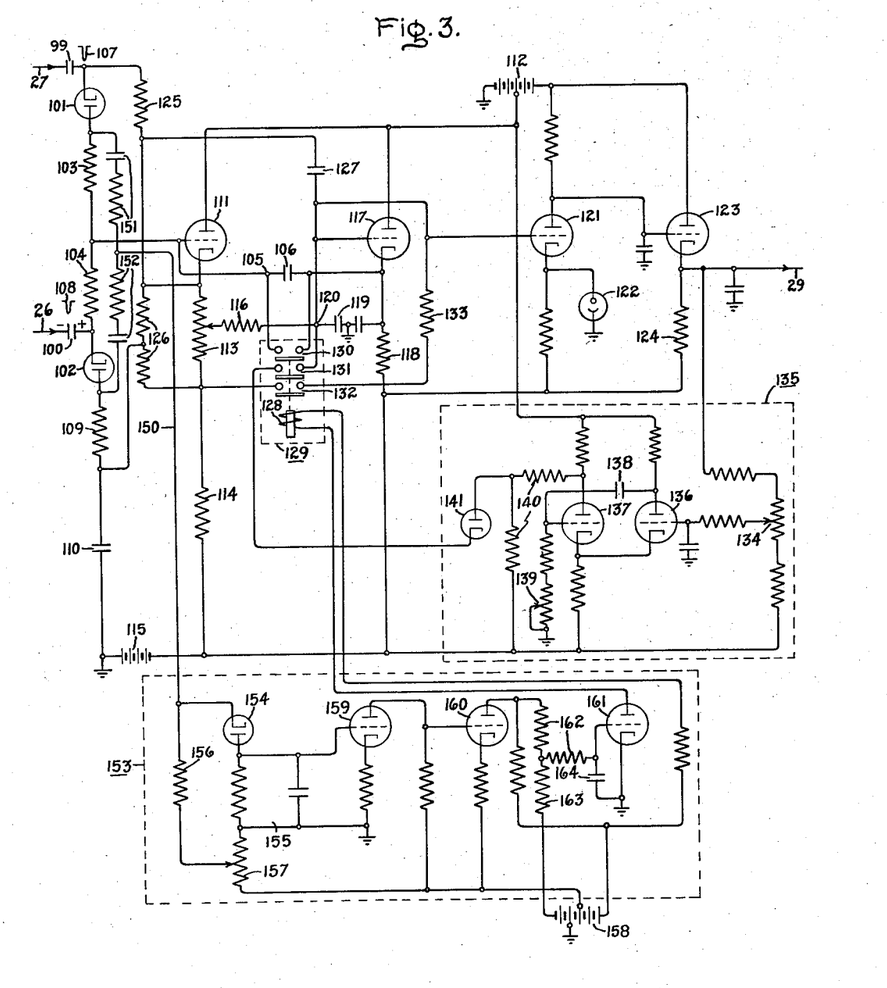
Fig. 3 is a detailed schematic circuit diagram of a portion of the apparatus shown in Fig. 1 and illustrative of my invention.

The control circuit illustrated in Fig. 3 is ideally suited to obviate such a difficulty. Its incorporation within the apparatus of Fig. 1 may be readily understood by noting that leads 26, 27 and 29 appear in both of these figures.

Lead 27 from coincidence device 25 is connected through a coupling condenser 99 to the cathode of a diode rectifier 101 and, similarly, lead 26 from coincidence device 24 is connected via a coupling condenser 100 to the cathode of another diode rectifier 102. The anode of diode 101 is connected to the cathode of diode 102 through a pair of series resistors 103—104, the junction of which is connected to one terminal 105 of a first integrating condenser 106. For the moment, let it be assumed that the remaining terminal of condenser 106 is fixed at a reference potential.

Diodes 101 and 102 are maintained in a non-conductive condition in the absence of applied pulses by means later to be described. If echo pulses occur solely during the periods in which coincidence device 25 is operatively conditioned by the "C" enabling pulses, pulses such as the one designated 107, of negative polarity, are applied to the cathode of diode 101. These drive the cathode negative relative to the anode of this diode and the resulting current flow through resistor 103 and condenser 106 causes terminal 105 to change voltage in a negative direction. The charging path for the condenser has a relatively low impedance during the pulse, however, after the occurrence of the pulse, diode 101 is no longer conductive and, other than stray leakage, there is no discharge path for the condenser through resistor 103. Thus, each of pulses 107 serve to charge condenser 106 in one direction and it effectively integrates with respect to time, the current produced by these pulses.

If the echo pulses occur during the "B" enabling pulses, pulses from coincidence device 24, such as represented by pulse 108, are applied to the cathode of rectifier 102 through coupling condenser 100. The cathode of the diode is driven negative relative to its anode and diode current flows through coupling condenser 100, through an anode resistor 109 and a by-pass condenser 110 to ground. Thus, during the occurrence of each of pulses 108, condenser 100 is charged with the polarity indicated in Fig. 3. Following the occurrence of each of pulses 108, condenser 100 discharges through resistor 104 and into condenser 106. The resulting current through condenser 106 has a polarity such that terminal 105 changes voltage in a positive direction. Since there is no discharge path, other than extraneous leakage currents, condenser 106 effectively integrates the error current produced by the applied pulses 108.

It is therefore apparent that the resulting rate of change of charge on condenser 106 depends upon the timing of received echo pulses relative to the "B" and "C" enabling pulses, for if pulses such as 107 from coincidence device 25 tend to produce a charge of one polarity on the condenser, pulses 108 from coincidence device 24 effectively remove some of that charge. Of course, whatever charge is imposed on condenser 106 by pulses 108 is opposed by the pulses 107. It is apparent that if the condition represented at the lower line of Fig. 2 is attained, wherein echo pulses are equally bracketed in time by the "B" and "C" enabling pulses, the resultant rate of change of charge on condenser 106 is zero.

When tracking a uniformly-moving reflecting object the rate of change of charge on condenser 106 is substantially zero since for this operating condition each reflected pulse is almost perfectly bracketed in time between pulses "B" and "C." The fixed charge on condenser 106 causes the potential on lead 29 to change at the proper rate to maintain the time-bracketing and thereby permit nearly perfect tracking. It is thus apparent that the charge on condenser 106 is a measure of relative velocity of the reflecting object.

In order to utilize the charge of condenser 106 for automatic range tracking, terminal 105 of the condenser is connected to the control electrode of an electron discharge device 111. The anode of device 111 is directly connected to a positive tap of a source of B supply potential 112, the negative terminal of which is grounded. Its cathode is connected through the resistance element of a potentiometer 113 which is connected through a resistor 114 to the negative terminal of another source of potential 115, the positive terminal of which is grounded. Thus, device 111 operates as a cathode-follower wherein potential changes at its grid appear at its cathode without a change of polarity.

The movable tap of potentiometer 113 is connected through a resistor 116 to the control electrode of another electron discharge device 117, the anode of which is directly connected to source 112. The cathode of device 117 is connected to the negative terminal of source 115 through a cathode resistor 118 and to the terminal of condenser 106 opposite terminal 105. Device 117 also operates as a cathode-follower and since its control electrode is connected through resistor 116 to the cathode of device 111, and its cathode is connected through condenser 106 to the control electrode of device 111, a regenerative circuit is formed and a second integrating condenser 119 connected between the control electrode of device 117 and ground is coupled to that regenerative circuit.

Thus, a potential developed across condenser 106 due to the velocity of a remote object being tracked, produces a similar potential at the cathode of device 111 which, in turn, produces a charging current for condenser 119 that flows through resistor 116. As condenser 119 charges, the control electrode of device 117 is altered in potential and the correspondingly varied cathode potential of device 117 further changes the grid potential of device 111 via condenser 106. In this way, the charging current for condenser 119 is independent of the absolute voltage across it and condenser 119 charges at an essentially constant linear rate which is proportional to the amount of charge on condenser 106.

The potential of condenser 119 at terminal 120 is applied directly to the control electrode of an electron discharge device 121 having an anode load resistor connected to the positive terminal of source 112. The cathode of device 121 is connected to the negative terminal of source 115 through a cathode bias resistor and a voltage stabilizing device 122 is connected between the cathode and ground, thereby to maintain the cathode at a fixed potential relative to ground.

The resulting charge potential of condenser 119 thus is amplified and the potential at the anode of device 121 is applied directly to the control electrode of electron discharge device 123, the anode of which is connected to source 112 and the cathode of which is connected through an output load resistor 124 to the negative terminal of source 115. Device 123 operates as a cathode follower and the anode potential variations of device 121 are translated, without change of polarity, to lead 29 whereby such variations are conveyed to square wave generator 18.

In summarizing the operation of the circuit thus far described, let it be assumed that the apparatus is tracking a remote object which is moving away from the location of the apparatus. As pointed out hereinbefore, for a tracking condition, received echo pulses are almost perfectly bracketed in time by the "B" and "C" enabling pulses and condenser 106 is charged. For the assumed direction of movement of the remote object, the charge potential on condenser 106 is such that terminal 105 is negative relative to the other condenser terminal. The amount of potential across condenser 106 depends upon object velocity and if, for example, this velocity is constant, the potential is fixed. Accordingly, the resulting charging current for condenser 119, which is proportional to the potential across condenser 106 is constant.

As the remote object continues to move away from the location of the equipment, the resulting potential on terminal 120 of condenser 119 decreases and the direction of this change of potential is reversed by electron discharge amplifier device 121. The resulting positively increasing potential is applied via cathode follower 123 and lead 29 to generator 18 for increasing the delay of the "A" pulses with respect to the pulses transmitted by antenna 13.

The interval of enabling pulses "B" and "C" thus follows movement of the remote object thereby to provide automatic range tracking. It may similarly be shown that for an object moving toward the site of the equipment, the potential at lead 29 decreases as the range closes. The potential at lead 29 is a measure of range and suitable indicator means (not shown) may be connected thereto.

At long ranges, extreme fading may result in the temporary loss of echo pulses. Should this occur, pulses 107 and 108 temporarily disappear, however, since there is essentially no discharge path for the first integrating condenser 106, the charge potential which it assumed due to the velocity of the remote object, just prior to the loss of echo pulses, remains fixed. The charging current for condenser 119 also remains fixed and the resulting potential at lead 29 continues to vary.

Therefore, despite the loss of echo pulses, the interval of enabling pulses "B" and "C" is continuously displaced in time at a fixed rate during the interruption in the supply of echo pulses and the interval is correctly positioned in time to continue automatic range tracking of the remote object. Of course, if the remote object makes a radical change in velocity during the interruption in echo pulses, the interval of enabling pulses may not be properly time-positioned upon the re-establishment of contact with the remote object. However, during the usually short fading periods, such a radical change in velocity is practically impossible for a remote object to accomplish.

An important characteristic of my invention is the isolation of the two integrating condensers 106 and 119 by cathode follower 111. By not permitting the charging current for condenser 106 to flow through condenser 119, an advantage is gained in that condenser 106 may have a large value and the circuit can still become stabilized and attain good velocity memory in a short time after a target is first encountered. If condenser 106 has a relatively small value, leakage currents may rapidly alter its charge, giving poor "velocity memory" action. If condensers 106 and 119 are not isolated and condenser 106 has a relatively large value to avoid errors due to leakage currents, an excessive amount of time is required to attain the correct velocity voltage across condenser 106.

As mentioned hereinbefore, the circuit of Fig. 3 includes means for biasing diodes 101 and 102 so that they are normally non-conductive in the absence of pulses from coincidence devices 24 and 25. For this purpose, the cathode of diode 101 is connected through an isolating resistor 125 to the cathode of electron discharge device 111. Since the anode of diode 101 is connected to the control electrode of device 111 and the cathode of device 111 is always at essentially a fixed positive potential relative its control electrode, the cathode of diode 101 is biased positively relative to the anode and, hence, is normally non-conductive.

Inasmuch as the cathode of diode 102 is connected to the control electrode of device 111, the anode of the diode is connected through resistor 109 to the junction of a pair of series-connected resistors 126 which are shunted across the resistance element of potentiometer 113. The resistors 126 are apportioned so that diode 102 also is maintained in a normally non-conductive condition.

The range tracking system of Fig. 3 further includes a stabilizing condenser 127 having one of its terminals connected to the junction of isolating resistor 125 and potentiometer resistance element 113, at the cathode of device 111. The other terminal of this condenser is connected to terminal 120 of integrating condenser 119. If, for example, stabilizing condenser 127 is omitted from the circuit, and an attempt is made to track a reflecting object, the voltage on lead 29 tends to oscillate about its proper value. Such oscillations may increase in amplitude to a degree that the interval of enabling pulses "B" and "C" is carried completely beyond the interval of received echo pulses and automatic tracking ceases.

Stabilizing condenser 127 alters the phase shift and attenuation characteristics, as a function of frequency, for the tracking circuit in such a manner as to suppress any tendencies toward oscillation. With the circuit thus stabilized, automatic range tracking is efficiently and reliably carried out and the possibilities of losing the reflecting target are minimized.

It may be appropriate to point out that the ability of the tracking circuit of Fig. 3 to follow an accelerating target may be altered by varying the capacitance value of stabilizing condenser 127. This aspect of the circuit will be described more fully hereinafter in connection with Fig. 4. However, with respect to Fig. 3, the capacitance of this condenser is fixed at a value which provides a desired tracking ability.

In the following description of the range-searching and alarm functions of the circuit arrangement shown in Fig. 3, it is initially assumed that actuating coil 128 of an alarm relay 129 is energized and that its three sets of contacts 130, 131, and 132 are closed. In this condition of operation, contacts 130 short circuit the first integrating condenser 106, and the potential at the junction of potentiometer resistance element 113 and resistor 114 is applied over contacts 132 and a resistor 133 to terminal 120 of the second integrating condenser 119.

As a result of the applied potential, which is negative relative to point 120, a charging current flows into condenser 119 and the potential at terminal 120 varies in a negative direction at an essentially linear rate. The resulting increase of potential with time from amplifier device 121 is supplied via cathode follower 123 and lead 29 to generator 18 and the rectangular pulse "A" of Fig. 2 moves in a direction from left to right. In other words, the interval of "B" and "C" pulses is displaced outwardly in range at an essentially fixed, linear rate.

The potential at lead 29 is applied to a potentiometer 134 included in a fly-back generator 135. A selected portion of this potential at the top of the potentiometer is supplied to the by-passed control electrode of an electron discharge device 136. Device 136 is included in a multivibrator circuit including another electron discharge device 137 and these devices have a common cathode resistor connected to the negative terminal of source 115. Individual anode resistors of devices 136 and 137 are connected to the positive tap of source 112 and the anode of device 136 is connected through a condenser 138 to the control gride of device 137 which, in turn, is connected to ground through a variable resistor 139. Device 137 is normally conductive since its control grid is connected to ground whereas device 136 is normally non-conductive because potentiometer 134 is connected to the negative terminal of source 115. Moreover, the high anode-cathode current flow in device 137 produces a voltage drop in the common cathode resistor which serves to maintain device 136 cut off.

When the potential at lead 29 reaches a value predetermined by the setting of potentiometer 134, the control electrode of device 136 is carried to such a potential that current flow is initiated therein. The resulting potential drop at the anode of device 136 is applied via condenser 138 to the control electrode of device 137 and the cathode of the latter device thereby is driven in a negative sense to carry the cathode of device 136 negatively. This action is regenerative and, essentially instantaneously, conduction is transferred between devices 136 and 137. This condition is maintained until the charge condition of condenser 138 is altered whereby the initial set of conditions is established. In this way, at the instant the potential at lead 29 reaches the predetermined value, a positive pulse is developed at the anode of device 137.

A voltage divider 140 is connected between the anode of device 137 and the negative terminal of source 115 and the tap thereof is connected to the anode of a diode rectifier 141. The diode thus is normally maintained in a non-conductive condition and its cathode is connected through contacts 131 to terminal 120 of condenser 119. When a pulse from device 137 is applied to the anode of diode 141, a conductive current path is established from condenser 119 through the diode of sufficiently low impedance to discharge the condenser very quickly. The potential at lead 29 abruptly decreases and the "A" pulse of Fig. 2 quickly returns to the left.

This cycle of operation is repetitive until reflected pulses from a remote object are intercepted. Echo pulses, which occur during either of the "B" and "C" enabling pulses, appear either at anode resistors 103 or 109 of diodes 101 and 102, respectively. Load resistor 103 is connected to a lead 150 through a coupling condenser-coupling resistor series network 151 and load resistor 109 is coupled to lead 150 through a similar coupling network 152. Hence, pulses at either of the load resistors appear at lead 150 and are applied to an alarm circuit 153. Lead 150 is directly connected to the cathode of a normally non-conductive diode rectifier 154. The anode of diode 154 is grounded through a filter network 155 including a resistor in parallel with a condenser. The cathode of the diode is connected through a resistor 156 to the movable tap of a potentiometer 157 which is shunted between ground and a positive tap of a B supply source 158. The adjustment of the tap of potentiometer 157 provides the necessary non-conductive condition in the diode.

The anode of diode 154 is connected to the control electrode of an electron discharge device 159 having its anode directly connected to the control electrode of another electron discharge device 160 which also has its anode connected to still another electron discharge device 161. The devices 159—161 are connected in a conventional directly-coupled amplifier circuit. The circuit connection between the anode of device 160 and the control electrode of device 161 includes a pair of series resistors 162, the junction of which is connected through a resistor 163 to a portion of source 158 of negative polarity relative to ground. The circuit constants are arranged so that with diode 154 in its normally non-conductive condition, device 159 is highly conductive, device 160 conducts a relatively lesser amount of current and device 161 is highly conductive thereby energizing coil 128 of relay 129. This is the condition of the circuit during the range-searching operation.

Negative pulses at lead 150 drive the cathode of diode 154 negative relative to its anode and current flows therein. As a result, the potential at the control electrode of device 159 is carried negative with respect to the initial condition and current flow in device 159 decreases. The potential at the anode of device 159 thus becomes more positive and the control grid of device 160 is carried more positive thereby to increase conduction in device 160. As a result, the potential at the anode of device 160 decreases to decrease conduction in device 161 and thereby de-energize relay coil 128. Contacts 130, 131 and 132 are opened and the control circuit is transferred from its range-searching to the range-tracking function. Automatic range tracking then occurs in the manner described hereinbefore.

If, for any reason, echo pulses are completely lost for longer than a pre-selected interval of time, the interruption in the supply of pulses at lead 150 causes the alarm circuit 153 to resume its initial set of conditions and relay coil 128 is energized to effect automatic range searching.

During periods of temporary loss of echo pulses, the alarm circuit is not restored to its initial set of conditions because the time constant of filter circuit 155 together with the time constant of the circuit including a condenser 164 connected between the control electrode and cathode of device 161 are sufficiently long to prevent rapid operation. Therefore, during short fading periods in the range-tracking process, relay coil 128 remains de-energized. The tap of potentiometer 113 is adjusted so that, with coil 128 de-energized by removing device 161 from the circuit and the usual noise components supplied to diodes 101 and 102 instead of pulses 107 and 108, the charge of condenser 119 slowly becomes more positive, if condenser 106 is completely discharged. Under these conditions, the potential at lead 29 slowly drifts negatively carrying the interval of enabling pulses "B" and "C" inward. In this way, if echoes are encountered and alarm circuit 153 is slow in acting and causing the interval of enabling pulses to travel beyond the interval of echoes, the inward drift of the interval of enabling pulses establishes coincidence and automatic tracking is initiated.

As pointed out hereinbefore, the circuit of Fig. 3 has an accurate "memory" of range rate which is maintained during an interruption in the supply of echo pulses. However, inasmuch as devices 111 and 117 are of the cathode-follower type, it is evident that the amplification factor of the regenerative circuit which includes the second integrating condenser 119 approaches, but is not equal to unity. Accordingly, if the reflecting object travels at an extremely rapid rate and if the interval during which echo pulses are lost is relatively long, the charging rate of condenser 119 may not keep pace with movement of the remote object.

Figure 4:
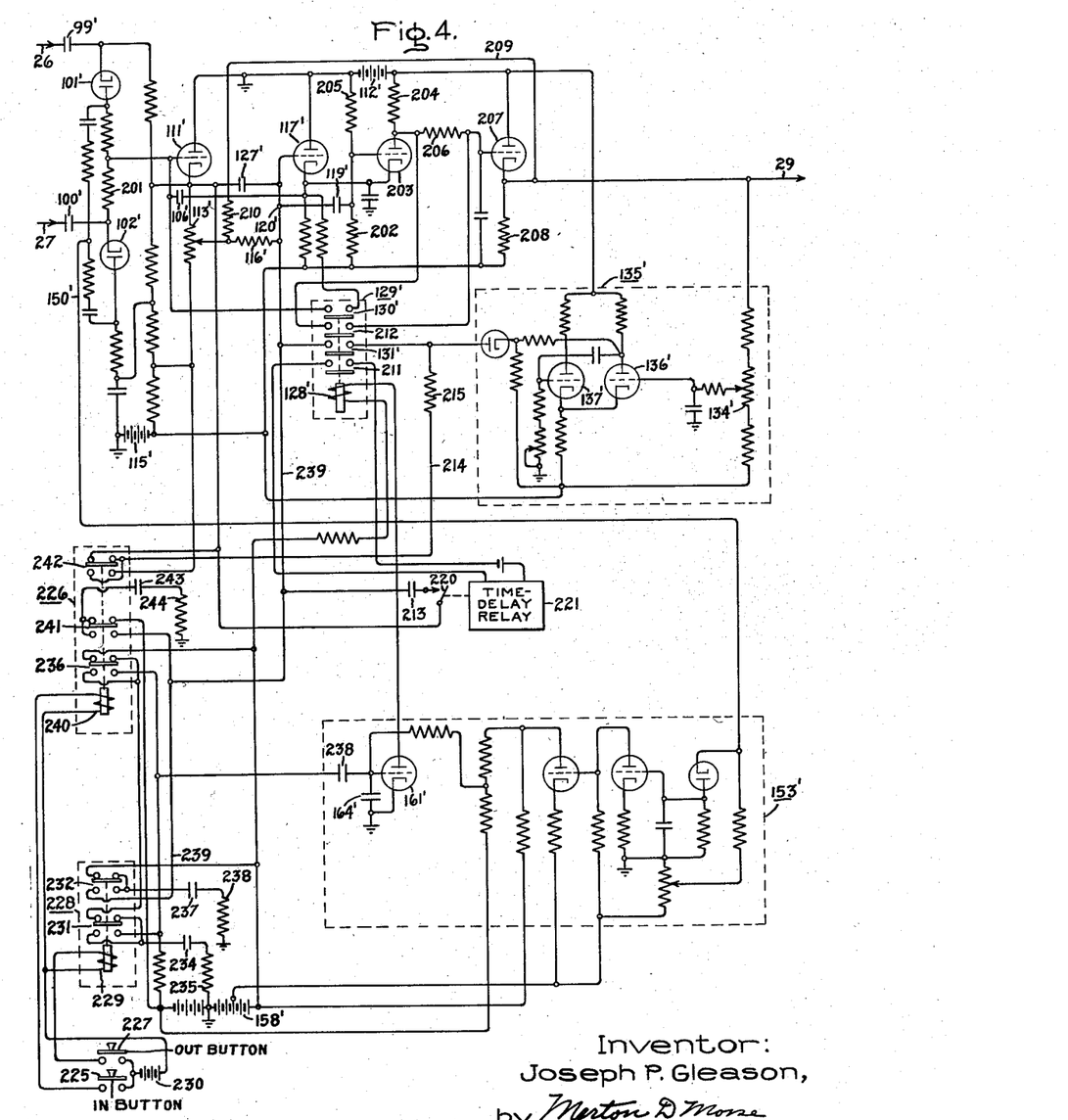
Fig. 4 is a detailed schematic circuit diagram of another embodiment of my invention.

The modified circuit of Fig. 4 is designed to overcome this deficiency and in addition to this feature, other features of my invention are there illustrated.

Elements of Fig. 4 which correspond to certain of the elements in Fig. 3 are designated by the same reference numeral followed by a prime designation.

Pulses at lead 26 are applied through coupling condenser 99' to the cathode of diode rectifier 101' and pulses at lead 27 are applied via coupling condenser 100' to the cathode of diode rectifier 102'. A resistor 201 connects the anode of diode 101' to the cathode of diode 102' and the anode of diode 101' is connected via a tap of resistor 201 to the control electrode of an electron discharge device 111' connected in a cathode follower circuit. The first integrating condenser 106' is connected between the control electrode of device 111' and the cathode of another electron discharge device 117'. The control electrode of device 117' is connected to terminal 120' of the second integrating condenser 119', the other terminal of which is connected to a resistor 202, in turn, connected to the negative terminal of potential source 115'. The tap of potentiometer 113', in the cathode circuit of device 111', is connected through a resistor 116' to the control electrode of device 117' and thus the cathode follower type regenerative circuit described in connection with Fig. 3 is provided. Stabilizing condenser 127' is connected between the cathode of device 111' and the control electrode of device 117'.

The circuit thus far described operates in essentially the same manner as does the circuit of Fig. 3. Echo pulses at leads 26 and 27 produce current pulses in diodes 101' and 102' and a potential is developed at condenser 106' of a polarity and magnitude dependent upon relative velocity of the reflecting object. As the result of this potential, current flows through resistor 116' to establish a potential on condenser 119' which varies in magnitude as the range to the remote object varies. Since leads 26 and 27 of Fig. 3 are reversed in Fig. 4, the charge on condenser 119' is of opposite polarity for a given direction of movement of the object being tracked. This potential appears at the cathode of cathode follower device 117' and is applied to the cathode of an electron discharge device 203. The anode of device 203 is connected to the positive terminal of source 112' through an anode load resistor 204 and its grid is connected to the junction of condenser 119' and resistor 202 and to ground through a grid resistor 205. Device 203 operates as a grounded-grid, cathode-driven amplifier.

Amplified potential variations, which appear at the anode of device 203 with no change of polarity, are applied over a coupling resistor 206 to the control electrode of an electron discharge device 207. The anode of device 207 is connected to the positive terminal of source 112' and its cathode is connected to the negative terminal of source 115' through a cathode load impedance 208. Device 207 operates as a cathode follower and the potentials applied to its grid appear at its cathode with no change of polarity. Thus, the potential produced by the charging current of condenser 119' is translated by devices 203 and 207 and is supplied over lead 29 to generator 18 for controlling the occurrence of the "A" pulse.

The cathode of device 207 is connected by a lead 209 and a resistor 210 to the variable tap of potentiometer 113'. It is thus apparent that in addition to the regenerative circuit including cathode follower devices 111' and 117', there is provided an auxiliary regenerative circuit around cathode follower device 117'. Specifically, potential changes at the grid of cathode follower device 117' appear at its cathode and are supplied to the cathode of device 203. After amplification, the resulting potential changes appear at the anode of device 203 and are applied to the control grid of device 207. Changes in potential at the cathode of device 207 are applied over lead 209 and resistor 210 and resistor 116' to the control electrode of device 117'. This auxiliary regenerative circuit together with the primary regenerative circuit provides a primary circuit loop gain which may be greater than unity.

In operation, the amplification of the primary circuit loop is adjusted so that it is substantially equal to unity. If the adjustment is made to a point greater than unity, it is evident that during a loss of echo pulses, the charging rate of condenser 119' increases and slightly erroneous range information may be developed. Such an occurrence, of course, may be as detrimental as the conditions ascribed to the circuit of Fig. 3 wherein a gain less than unity produces a range rate which decreases during the loss of echo pulses. If an incorrect range is generated during a fading period, it is quickly corrected when echo signals again appear.

The circuit of Fig. 4 also includes an alarm circuit 153' coupled to the anode circuits of diodes 101' and 102' by a lead 150'. Echo pulses operate the alarm circuit in the same manner as described in connection with alarm 153 shown in Fig. 3. The alarm relay 129' has its energizing coil 128' in the anode circuit of electron discharge device 161' and in addition to contacts 130' and 131' which function like contacts 130 and 131 of Fig. 3, there are included in the relay contacts 211 and 212.

As pointed out in connection with Fig. 3, the capacitance value of stabilizing condenser 127 determines the tracking ability of the circuit as to target accelerations. It has been found that the larger the size of this condenser, the better the circuit responds to high accelerations.

In Fig. 4, condenser 127' has a smaller value than its counterpart in Fig. 3 and during the range-searching function of the equipment it is shunted by another condenser 213 via normally open contacts 220 of a time-delay relay 221 that is connected to a battery via contacts 211 of relay 129'. Condensers 127' and 213 have a parallel capacitance value which is high enough to permit a high-acceleration response so that when echo pulses are encountered and alarm relay 129' is actuated, the circuit may quickly reach a lock-on condition thereby minimizing the possibility of missing the target.

After the occurrence of a time interval suitable to permit a complete lock-on, one-quarter second for example, time-delay relay 221 operates and contacts 220 are opened. Thus, the stabilizing capacitance is reduced to the value of condenser 127' alone which, although high enough for adequate stabilization against circuit oscillation, is low enough to provide a reduced ability to track target acceleration and automatic tracking is assured through various conditions of interference. For example, pulses which are displaced slightly in time from the desired echo pulses might represent to the equipment an exceedingly fast change of velocity or a high acceleration. However, since the range tracking system cannot respond to exceedingly high accelerations, automatic tracking of the desired remote object continues notwithstanding the presence of the interference.

Referring to contacts 212, in the range-searching function of the equipment, these contacts connect together the terminals of resistor 206. This decreases the time constant of the control electrode circuit of device 207 to permit the fast action required during fly-back of the range search. During automatic tracking relay coil 128 is de-energized and contacts 212 are open.

Another difference in the circuit of Fig. 4 is that in the range-searching operation, in order to cause the "A" pulse to sweep outwardly in range, a charging potential of the opposite polarity for condenser 119', as in the circuit of Fig. 3, is employed. This potential is derived at the upper end of potentiometer 113' and applied via contacts of a circuit to be described hereinafter, a lead 214, a resistor 215 and contacts 131' to terminal 120'. Thus, although cathode-driven amplifier 203 produces no phase reversal, the potential at lead 29 sweeps upward. Fly-back generator 135' is suitably modified, with diode 141' being reversed and connected to the anode circuit of device 136' rather than device 137'. Aside from this variation, the fly-back generator 135' operates in the same manner as generator 135 to produce at a predetermined input voltage magnitude, a pulse which makes diode 141' conductive thereby to discharge condenser 119'.

At some time during the range-tracking function of the apparatus, it may be desirable to "unlock" the tracking system from the remote object being followed in range and cause the interval of enabling pulses to search inwardly or outwardly in range. To that end, the control circuit includes an "in" button 225 with an associated relay 226 and an "out" button 227 with an associated relay 228.

Referring first to relay 228, it comprises an actuating coil 229 and two sets of single pole, double throw contacts 231 and 232. The movable arms of these contacts are in the positions illustrated when coil 229 is de-energized. The movable arm of contacts 231 is connected to ground through a charging condenser 234 in series with a resistor 235. It completes a circuit with the upper one of these contacts which is connected to the movable arm of a set of single pole, double throw contacts 236 of relay 226. The arm of contacts 236 is normally in circuit engagement with the upper contact which, in turn, is connected to the positive terminal of potential source 158'. Thus, condenser 234 is normally charged to a positive polarity relative to ground.

The movable arm of contacts 232 is connected to ground through a condenser 237 in series with a resistor 238 and the upper contact is connected to the positive terminal of source 158' so that condenser 237 normally is charged positively relative to ground.

When it is desired to cause the interval of enabling pulses to be displaced in time in an outward direction relative to the timing of echo pulses from an object being tracked, "out" button 227 is depressed thereby to energize coil 229 from battery 230. The movable arm of each set of contacts 231 and 232 is carried from the positions shown into circuit engagement with the lower ones of the respective sets of contacts.

As a result, condenser 234 is connected through a coupling condenser 238 to the control grid of electron discharge device 161' of alarm circuit 153'. This charges condenser 164', which is connected between the control grid and cathode of device 161', positively relative to ground and anode current flow is initiated in this device. Thus, relay coil 128' is energized and the alarm circuit 153' is effectively disabled.

The lower contact of set 232 is connected via a lead 239 to terminal 120' of second integrating condenser 119'. Thus, when the movable arm of set 232 is carried into engagement with the lower contact, the positive charge of condenser 237 is applied over lead 239 to terminal 120' of condenser 119'. This produces a sudden potential increase in a positive direction at condenser 119' and the corresponding potential charge at lead 29 causes the trailing edge of the "A" pulse developed by generator 18 to jump outwardly in range and coincidence is destroyed.

The charge on condenser 164' in the grid circuit of device 161' is maintained for a sufficiently long interval to permit complete unlocking of the interval of enabling pulses with the echo pulses. Upon the release of "out" button 227, the movable arms of contacts 231 and 232 are returned to the positions illustrated and because target pulses are no longer bracketed by the interval of enabling pulses, automatic range searching is effected in the manner described hereinbefore. This continues until echo pulses from the same or another object are encountered.

Referring now to the "in" button circuit, in addition to contacts 236, relay 226 also includes two sets of single pole, double throw contacts 241 and 242. The normal positions of the movable arms of contacts 236, 241 and 242 are as illustrated in Fig. 4.

As pointed out above, the movable arm of contacts 236 is connected through contacts 231 of relay 228 to condenser 234. This arm normally is in circuit engagement with the upper contact, which is connected to the positive terminal of source 158' so that condenser 234 is charged positively relative to ground.

The movable arm of contacts 241 is connected to ground through a condenser 243 in series with a resistor 244 and it is in circuit engagement with the upper contact of this set which is connected to the negative portion of source 158'. Thus, condenser 243 is charged negatively relative to ground.

In the position shown, the movable arm of contacts 242 connects lead 214 to the upper end of potentiometer 113' to supply the positive potential which charges condenser 119' for outward range sweeping.

Upon the closure of "in" button 225, relay coil 240 is energized from battery 230 and the movable arms of contacts 236, 241 and 242 are carried into circuit engagement with the lower ones of these sets of contacts. The arm of contacts 236 connects condenser 234 to coupling condenser 238 thereby charging condenser 164' positively and the alarm circuit 153' is disabled in the same manner as described in connection with "out" button 227.

The movable arm of contacts 241 connects condenser 243 to terminal 120' of condenser 119'. In this way the negative charge of condenser 243 is impressed upon condenser 119' and the interval of enabling pulses is abruptly carried inwardly in range thereby destroying coincidence and automatic tracking ceases.

Since in the usual range searching operation a positive charging potential is applied to condenser 119' for outward searching, this must be altered in order to effect inward searching. Contacts 242 serve this purpose and the movable arm of these contacts connects lead 214 to the lower contact which, in turn, is connected to the lower end of potentiometer 113'. A negative charging potential is applied to condenser 119' and interval of "B" and "C" enabling pulses is carried inwardly in range as long as button 225 is depressed.

The movable arms of contacts 236, 241 and 242 are returned to their illustrated positions with the release of "in" button 225 and outward, cyclic range searching is effected. Since the charge on condenser 164' gradually leaks off, the alarm circuit 153' is eventually restored to operative condition so that the system may respond to received echo pulses. If no echoes are encountered, at a predetermined range, fly-back circuit 135' operates in the same manner described hereinbefore and cyclic range searching continues.

Thus, it may be seen that as long as either of buttons 225 and 227 is depressed, the interval of enabling pulses "B" and "C" is displaced in time in a corresponding one of the two directions. With the release of the button, and assuming that coincidence is destroyed between the echo pulses and the interval of enabling pulses, automatic range searching occurs until such time as echo pulses are intercepted and supplied to alarm circuit 153'. Thereafter, automatic range tracking takes place and this continues through temporary losses of reflected pulses from the remote object being tracked.

While I have shown particular embodiments of my invention, it is to be understood that changes in modifications may be made without departing from the invention and in its broader aspects and therefore the aim of the appended claims is to cover all such changes and modifications as fall within the true spirit and scope of my invention.

What I claim as new and desire to secure by Letters Patent of the United States is:

1. A processing arrangement for signal energy subject to being interrupted comprising, first and second energy-storage devices, means responsive to said signal energy for establishing in said first device during an operating interval prior to an interruption in the supply of energy an accumulation of energy having a first value representing a characteristic of said signal energy, a signal-translating isolation stage coupling said first device to said second device for supplying thereto signal energy having a magnitude proportional to said first value to develop another accumulation of energy having a second value which varies in amplitude at a rate proportional to said first value, a regenerative circuit coupled to said second storage device and having an amplification factor in the neighborhood of unity for maintaining said rate of amplitude variation in said second device substantially proportional to said first value for at least portion of the duration of said interruption, means responsive to a duration of said interruption greater than said portion for simultaneously interrupting the supply of said signal energy by said signal-translating isolation stage to said second device and for energizing said second device to accumulate energy in a predetermined recurrent manner with time, and means to control the time-occurrence of said operating interval in accordance with the energy accumulated by said second device.

2. A processing arrangement for signal energy subject to being interrupted comprising, first and second energy-storage condensers, means responsive to signal energy for establishing in said first condenser during an operating interval prior to an interruption in the supply of said signal energy a first charge having a first value representing a characteristic of said signal energy, a signal-translating isolation stage coupling said first condenser to said second condenser for continuously supplying thereto a signal current having a magnitude proportional to said first value to develop a second charge having a second value which varies in amplitude at a rate proportional to said first value, a regenerative circuit coupling said first and second condensers and having an amplification factor in the neighborhood of unity for maintaing said rate of amplitude variation in said second condenser substantially proportional to said first value without disturbing the charge of said first condenser for at least a portion of the duration of said interruption, and means for utilizing said second charge of said second condenser to control the time-occurrence of said operating interval.

3. A tracking circuit comprising a source for providing signal energy during an operating interval prior to an interruption, a first energy-storage condenser coupled to said source for developing a first charge having a first value representing a characteristic of said signal energy, a second energy-storage condenser, a signal-translating isolation stage coupling said first condenser to said second condenser for supplying thereto a signal current having a magnitude proportional to said first value to develop a second charge having a second value which varies in amplitude at a rate proportional to said first value, a regenerative circuit coupling said first and second condensers and having an amplification factor in the neighborhood of unity for maintaining said rate of amplitude variation in said second condenser substantially proportional to said first value without disturbing the charge of said first condenser for at least a portion of the duration of said interruption, means responsive to a duration of said interruption greater than said portion for simultaneously interrupting the supply of said signal current to said second condenser and for energizing said second condenser to develop a further charge having a recurrent sawtooth waveform, means for utilizing said second and further charges of said second condenser to control the time-occurrence of said operating interval, and a stabilizing circuit extending from said source to said second condenser for inhibiting self oscillation in said tracking circuit.

4. A tracking circuit comprising a source for providing signal energy during an operating interval prior to an interruption, a first energy-storage condenser coupled to said source for developing a first charge having a first value representing a characteristic of said signal energy, a second energy-storage condenser, a signal-translating isolation stage coupling said first condenser to said second condenser for supplying thereto a signal current having a magnitude proportional to said first value to develop a second charge having a second value which varies in amplitude at a rate proportional to said first value, a regenerative circuit coupled to said second condenser and having an amplification factor in the neighborhood of unity for maintaining said rate of amplitude variation in said second condenser substantially proportional to said first value for at least a portion of the duration of said interruption, means for utilizing said second charge of said second condenser to control the time-occurrence of said operating interval, a reactive impedance extending from said source to said second condenser for inhibiting self oscillation in said tracking circuit, and means responsive to a duration of said interruption greater than said portion for varying the value of said reactive impedance to adjust the tracking ability of said circuit.

5. A processing arrangement for signal energy subject to interruption comprising, first and second energy-storage condensers, means responsive to signal energy for establishing in said first condenser during an operating interval prior to an interruption in the supply of said signal energy a first charge having a first value representing a characteristic of the timing relation of said signal energy relative to a reference signal, a signal-translating isolation stage coupling said first condenser to said second condenser for continuously supplying thereto a signal current having a magnitude proportional to said first value to develop a second charge having a second value which varies in amplitude at a rate proportional to said first value, a regenerative circuit coupling said first and second condensers, including said isolation stage and having an amplification factor in the neighborhood of unity for maintaining said rate of amplitude variation in said second condenser substantially proportional to said first value without disturbing the value of charge on said first condenser for at least a portion of the duration of said interruption, and means for utilizing said second charge of said second condenser to control the time-occurrence of said operating interval with respect to said reference signal.

6. A tracking circuit for following the phasing of a pulse-type wave, subject to interruption, relative to a reference signal comprising first and second energy-storage devices, means responsive to said pulse-type wave for establishing in said first device during an operating interval prior to an interruption of said pulse type wave, a first accumulation of energy therein having a first value representing the rate of phase variation of said wave with respect to said reference signal, a signal-translating isolation stage coupling said first device to said second device for continuously supplying thereto signal energy having a magnitude proportional to said first value to develop a second accumulation of energy having the second value which varies in amplitude at a rate proportional to said first value, a regenerative circuit coupling said first and second storage devices, including said translating stage and having an amplification factor in the neighborhood of unity for maintaining said rate of amplitude variation in said second device substantially proportional to said first value without disturbing the value of energy accumulated by said first device for at least a portion of the duration of said interruption, and means for utilizing said second accumulation of said second device to control the time-occurrence of said operating interval.

7. A tracking circuit for following the phasing of a pulse-type wave, subject to interruption, relative to recurrent reference pulses comprising a first energy-storage device, means responsive to said wave for establishing in said first device during an operating interval prior to an interruption of said pulse type wave, a first accumulation of energy having a first value representing the rate of phase variation of said wave with respect to said reference pulses, a second energy-storage device, a regenerative circuit having an amplification factor in the neighborhood of unity coupled between said first and second devices and including a pair of translating devices coupled in cascade, said second energy-storage device coupled to said first device via one of said translating devices for developing a second accumulation of energy having a second value which varies in amplitude at a rate proportional to said first value for at least a portion of the duration of said interruption, and means for utilizing said second accumulation of said second storage device to control the time-occurrence of said operating interval.

8. A tracking circuit for following the phasing of recurrent signal pulses subject to interruption relative to recurrent reference pulses comprising a first energy-storage condenser, means responsive to said signal pulses for establishing in said first condenser during an operating interval prior to an interruption in the supply of said signal pulses a first charge having a first value representing the rate of phase variation of said signal pulses with respect to said reference pulses, a pair of translating stages connected in cascade to constitute a regenerative circuit having an amplification factor in the neighborhood of unity, said first condenser being included in series with said regenerative circuit to establish a regenerative current therein proportional to said first charge, a second energy-storage condenser coupled in shunt with said regenerative circuit and thereby being isolated from said first condenser by one of said stages for developing a second charge having a second value which varies in amplitude at a rate proportional to said first value for at least a portion of the duration of said interruption, and means for utilizing said second charge of said second condenser to control the time-occurrence of said operating interval.

9. A processing arrangement for signal energy subject to interruption comprising, first and second energy-storage condensers, means responsive to signal energy for establishing in said first condenser during an operating interval prior to an interruption in the supply of said signal energy a first charge having a first value representing a characteristic of said signal energy, a signal-translating isolation stage coupling said first condenser to said second condenser for supplying thereto a signal current having a magnitude proportional to said first value to develop a second charge having a second value which varies in amplitude at a rate proportional to said first value, a primary regenerative circuit coupled to said second condenser and having an amplification factor less than unity for maintaining said rate of amplitude variation in said second condenser substantially proportional to said first value for at least a portion of the duration of said interruption, a secondary regenerative circuit in shunt with at least a portion of said primary circuit to provide a resulting amplification factor in said primary circuit substantially equal to unity, and means for utilizing said second charge of said second condenser to control the time-occurrence of said operating interval.

10. A tracking circuit for following the phasing of recurrent signal pulses, subject to interruption, relative to recurrent reference pulses comprising a first energy-storage condenser, means responsive to said signal pulses for establishing in said first condenser during an operating interval prior to an interruption in the supply of said signal pulses a first charge having a first value representing the rate of phase variation of said signal pulses with respect to said reference pulses, a pair of cathode-follower type translating stages connected in cascade to constitute a primary regenerative circuit having an amplification factor less than unity, said first condenser being included in series with said regenerative circuit to establish a regenerative current therein proportional to said first charge, a second energy-storage condenser coupled in shunt with said regenerative circuit and thereby being isolated from said first condenser by one of said stages for developing a second charge having a second value which varies in amplitude at a rate proportional to said first value for at least a portion of the duration of said interruption, a secondary regenerative circuit including at least one of said signal-translating stages to provide a resulting amplification factor in said primary circuit substantially equal to unity, and means for utilizing said second charge of said second condenser to control the time-occurrence of said operating interval.

11. A receiver for pulses returned from remote objects wherein said pulses are subject to interruption comprising a pair of normally disabled echo-pulse translating stages and a control device for operatively conditioning said stages in succession during time intervals controllable in occurrence, a range-tracking system comprising a circuit for subtracting the output pulses of said translating stages to derive a resulting average current proportional to the relative acceleration of said pulse returning object, a first-energy-storage condenser coupled to said circuit to develop a first charge having a first value representing the time integral of said resulting average current occurring during an operating interval prior to an interruption in the supply of pulses from said translating stages, a second energy-storage condenser, a signal-translating isolation stage coupling said first condenser to said second condenser for supplying thereto a potential having a magnitude proportional to said first value to develop a second charge having a second value which varies in amplitude at a rate proportional to said first value, a regenerative circuit coupling said first and second condensers and having an amplification factor in the neighborhood of unity for maintaining said rate of amplitude variation in said second condenser substantially proportional to said first value for at least a portion of the duration of said interruption, and means coupling said second condenser to said control device to control the time-occurrence of said time intervals in accordance with said second charge of said second condenser.

References Cited in the file of this patent

UNITED STATES PATENTS

| | | |
|---|---|---|
| 2,467,208 | Hahn | Apr. 12, 1949 |
| 2,495,753 | Mozley | Jan. 31, 1950 |
| 2,516,356 | Tull et al. | July 25, 1950 |
| 2,543,072 | Stearns | Feb. 27, 1951 |
| 2,578,256 | MacNichol | Dec. 11, 1951 |
| 2,774,064 | O'Neil | Dec. 11, 1956 |